May 15, 1962 W. L. ANDERSON ET AL 3,035,259
RADAR NAVIGATION
Filed March 6, 1958
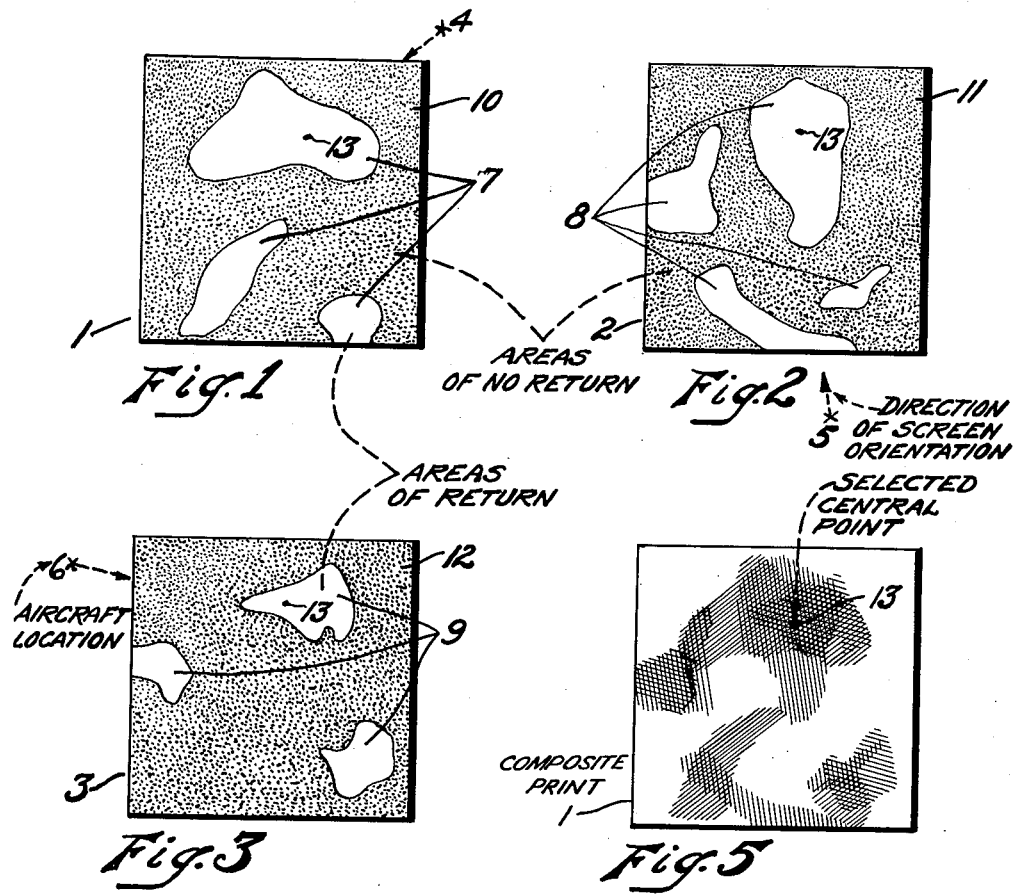
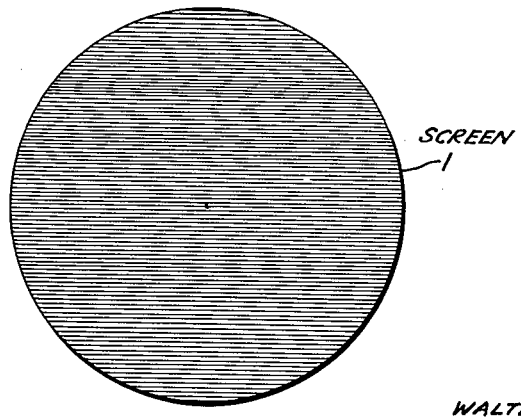
INVENTORS
WALTER L. ANDERSON
SHONLOSS R. SNODEY
AND WILLIAM G. WELCHMAN
BY
ATTORNEYS

United States Patent Office 3,035,259
Patented May 15, 1962

3,035,259
RADAR NAVIGATION
Walter L. Anderson, Falls Church, Va., Shonloss Richard Snodey, Washington, D.C., and William Gordon Welchman, New York, N.Y., assignors, by mesne assignments, to the United States of America as represented by the Secretary of the Air Force
Filed Mar. 6, 1958, Ser. No. 719,702
3 Claims. (Cl. 343—5)

This invention relates to radar as an aid to navigation, and more particularly to methods and means to provide radar return symbolization for radar charted features.

In the prior art, an airborne radar would view a preselected ground target area and the return signals from aforesaid target would be reflected as an image on the screen of the Plan Position Indicating oscilloscope, hereinafter referred to as the PPI scope, associated with said airborne radar. The image would in effect be a presentation of the preselected area being viewed. The presentation on the screen of the PPI scope would be photographed by means of a camera and utilized in the future to identify the preselected target area.

Because the intensity of radar returns varies greatly with changes in direction, the analysis of any given area should include a determination of stable or common points of radar reflection indicated in radar PPI scope photographs of said given area. This analysis is especially important as to the stability of a preselected point in said area because unforeseen circumstances may require that a run be made at an angle considerably different from the planned angle of approach to said preselected point.

By the same token, it is also desirable to learn which points of no return are common to all radar PPI scope photographs of the area to determine their value as orientation aids. This is especially valuable in the case of rivers or flatlands in the vicinity of the preselected point.

In accordance with the invention, a series of PPI scope photographs are printed through a screen of closely spaced parallel lines which is oriented so that the lines point to the aircraft location from a preselected central point in the area. The screen of wires print only through areas of return so that in a composite print of n PPI photographs, areas of omnidirectional reflection will appear as n crosshatched areas while areas of no return will appear white.

This method of analyzing radar photographs of an area provides a simple convenient means for determining stable points of return and common areas of no return. It is especially valuable in providing quick identification of the direction from which certain points produce no return so that the radar observer may be briefed as to what points he may rely on for orientation purposes when approaching the area from a specified direction and which points will show up from any direction.

It is an object of this invention to provide a novel method and means for radar navigation.

It is a further object of this invention to provide a method and means of determining and registering the directional dependence of radar ground feature reflections.

The features of this invention which are believed to be new are set forth with particularity in the appended claims. The invention itself, however, together with further objects and advantages thereof may best be understood by reference to the following description when taken in conjunction with the accompanying drawings, in which:

FIGS. 1, 2 and 3 represent photographs of a preselected target area, each taken from a different aircraft location;

FIG. 4 is a grid comprising a screen of closely spaced parallel wires; and

FIG. 5 is a composite of FIGS. 1, 2 and 3 printed through a grid as shown in FIG. 4.

In a preferred embodiment of the invention a stable aiming point in a preselected target area is determined. This stable aiming point is utilized in a bombing run upon a preselected target area.

The preselected target area is viewed by means of an airborne radar. The representation of the area is displayed upon a PPI scope mounted in the aircraft in a position conveniently adjacent to the position occupied by an observer, and the representation is photographed by the observer, who performs the act of photographic recording of the representation by appropriate manipulation of the picture taking control element of a camera mounted on the PPI scope. 1, 2 and 3 of FIGS. 1, 2 and 3 represent positives of scope photographs of the same preselected target area, each taken from an aircraft location indicated by 4, 5 and 6, respectively. The location of the aircraft in relation to a selected point in the preselected target area is noted for each photograph.

The representations of scope photographs shown in FIGS. 1, 2 and 3 may be obtained by producing positive films from their corresponding negatives. The areas of radar return in the positives are transparent while the areas of no return are opaque. This is illustrated for the transparent areas at 7, 8 and 9 of positives 1, 2 and 3 of FIGS. 1, 2 and 3 respectively, and for the opaque areas at 10, 11 and 12, respectively.

A screen of wires wherein the wires are closely spaced and parallel to each other is shown in FIG. 4. Screen 1 is utilized as a grid. Positive film 1 as shown in FIG. 1 with the airplane location at 4 is printed through screen 1 of FIG. 4. Screen 1 is oriented so that its wires are parallel to the direction of a line from airplane location 4 to selected central point 13. Point 13 is common to positives 1, 2 and 3 of FIGS. 1, 2 and 3 respectively. Positive film 1 of FIG. 1 is then printed through screen 1 of FIG. 4.

Positive films 2 and 3 of FIGS. 2 and 3 respectively, are also printed through screen 1 of FIG. 4. Screen 1 is oriented in the same manner as described for positive film 1 of FIG. 1.

The positive films of FIGS. 1, 2 and 3 are printed through properly oriented screen 1 and are superimposed and form composite print 1 as shown in FIG. 5. Screen 1 prints only through areas of return so that in composite print 1 of FIG. 5 areas of omnidirectional reflection appear as three crosshatched areas while areas of no return appear white.

It is considered desirable to make a composite print of only three or four scope photographs, or areas of common return will not be as distinct. If six photographs are available, two composites may be prepared and then compared to each other. In any case, it may be desirable to choose photographs which will provide angles greater than about 45 degrees between screen lines.

The foregoing specific embodiment describes a way of practicing the invention. It will be apparent to those skilled in the art that many modifications are possible within the spirit and scope of the invention. While printing the positive films through a grid to form a composite containing additional information other than omnidirectional radar reflection, it is possible to print a composite film of the three positives without utilizing a grid. The areas of omnidirectional radar reflection will appear on the composite as a dark area and areas of no return will appear white.

What is claimed is:
1. The method of determining and registering the directional dependence of radar ground feature reflections comprising photographing a series of three radar presentations, each of which correspond to a presentation by an airborne radar viewing a preselected area from a different position, producing a series of positive films corresponding to said series of presentations, printing successively each of said positive films through a grid of closely spaced parallel lines, said grid being oriented so that said lines are substantially parallel to the direction of a line from said airborne radar to a selected central point in said preselected area at the time of said photographing thus forming a composite print.

2. The method of determining and registering the directional dependence of radar ground feature reflections comprising photographing a series of three radar presentations, each of which correspond to a presentation by an airborne radar viewing a target area from a different direction, producing a positive film from its corresponding negative for each of said presentations, wherein areas of radar return are transparent while areas of no return are opaque, printing successively each of said positives through a grid of closely spaced parallel lines thus forming a composite print, said grid being oriented so that said lines are substantially parallel to the direction of a line from said airborne radar to a selected central point in said target area at the time of said photographing.

3. The method of determining and registering the directional dependence of radar ground feature reflections comprising viewing a preselected ground target area with an airborne radar, thereby obtaining a ground radar reflection presentation of said target area displayed upon a plan position indicating oscilloscope associated with said airborne radar, said radar viewing of said ground target area being from three different directions, photographing said presentation obtained from each of said directions, producing a positive film from its corresponding negative for each of said photographings, printing each of said positive films through a grid of closely spaced parallel wires to form a composite, said grid being oriented so that said wires are substantially parallel to the direction of a line from said airborne radar to a selected central print in said target area at the time of said photographing.

References Cited in the file of this patent

UNITED STATES PATENTS

| | | |
|---|---|---|
| 640,469 | Jacobson | Jan. 2, 1900 |
| 2,291,683 | Boothe | Aug. 4, 1942 |
| 2,539,498 | Waller | Jan. 30, 1951 |
| 2,616,077 | Holser | Oct. 28, 1952 |